United States Patent Office 3,100,199
Patented Aug. 6, 1963

3,100,199
PREPARATION OF POLYACETALS FROM HALO-GENATED UNSATURATED CARBOXYLIC ACID ESTERS
James W. L. Fordham and George H. McCain, Painesville, Ohio, assignors to Diamond Alkali Company, Cleveland, Ohio, a corporation of Delaware
No Drawing. Filed Mar. 12, 1958, Ser. No. 720,819
7 Claims. (Cl. 260—73)

This invention relates to novel acetal polymers, to the preparation of various intermediates thereof, certain novel intermediates per se and to improved methods of their preparation.

This application is a continuation-in-part of co-pending application Serial No. 689,768, filed October 14, 1957.

In co-pending application Serial No. 689,768, there is described and claimed a novel type of polyvinyl alcohol characterized by an improved degree of regularity or crystallinity as evidenced, for example, by its insolubility in water which, of course, is in marked contrast to conventionally-prepared polyvinyl alcohol which is soluble in water.

The present invention comprises (A) the preparation of copolymers from monomers including (1) those described and claimed in the above-mentioned, co-pending application and (2) vinyl esters; (B) certain novel copolymers per se; (C) the hydrolysis of such copolymers to obtain new and improved forms of polyvinyl alcohol; and (D) to the further reaction of such polymers and copolymers, or a mixture of such polymers and copolymers, to form acetals and (E) to the preparation of acetals from polyvinyl alcohol so produced, as well as from the polyvinyl alcohol produced by the methods set forth in Serial No. 689,768, filed October 18, 1957.

More specifically, the present invention is concerned with the polymerization of a monomer obtained by reacting an acetylenically-unsaturated compound, notably actylene, with an acid, especially a carboxylic acid having the structure $$R(CR'R'')_n COOH$$

wherein R is selected from the group consisting of Cl, F, I, Br, CN, $NO_2$, OH, $NH_2$, COOX (wherein X is selected from the group consisting of H and lower alkyl radicals), SCN, SH, OY (Y being a lower alkyl radical) and halogen-substituted phenyl radicals; R' and R'' are selected from the group consisting of H, Cl, F, I, Br, CN, $NO_2$, OH, $NH_2$, COOX (wherein X is selected from the group consisting of H and alkyl radicals), SCN, SH, OY (Y being a lower alkyl radical), and halogen-substituted phenyl radicals; and $n$ is a number from 0 to 20, inclusive, to obtain a monomer of the structure $$R(CR^1R^2)_n COOCR^3 = CR^4_2$$

wherein R is defined as herinbefore; $R^1$ and $R^2$ are selected from the group consisting of H, Cl, F, I, Br, CN, $NO_2$, OH, $NH_2$, COOX (wherein X is selected from the group consisting of H and alkyl radicals), SCN, SH, OY (Y being a lower alkyl radical), and halogen-substituted phenyl radicals; $R^3$ is selected from the group consisting of H and lower alkyl radicals, especially $CH_3$; $R^4$ is selected from the group consisting of H and F; and $n$ is a number from 0 to 20, inclusive; (2) polymerizing said monomer per se or in admixture with a vinyl ester to obtain a polymer; and (3) converting the said polymer, preferably by hydrolysis, e.g., alcoholysis, to a substantially water-insoluble polyvinyl alcohol.

The term "vinyl ester" as used in the specification and claims is intended to mean one or more esters of a carboxylic acid. Illustrative of carboxylic acids are formic acid, acetic acid, propionic acid, butyric acid, valeric acid, caproic acid, caprylic acid, capric acid, palmitic acid, stearic acid, and the like. Specific illustrative vinyl esters are vinyl formate, vinyl acetate, vinyl propionate, vinyl butyrate, vinyl valerate, vinyl caproate, vinyl caprylate, vinyl caprate, vinyl palmitate, vinyl stearate, vinyl-2-ethylhexylanoate, and the like, vinyl acetate at present being preferred.

Generally, the vinyl ester and the monomer of the structure $$R(CR^1R^2)_n COOCR^3 = CR^4_2$$

as previously defined, can be combined in varying proportions although for practical purposes it has been found that if the high degree of water insolubility in the resultant copolymer is to be achieved, amounts of the vinyl ester in excess of about 10% by weight should not be employed; generally 10% of vinyl ester by weight of the total monomer mixture constitutes a preferred maximum amount, e.g., 10% vinyl acetate–90% vinyl trifluoroacetate or 1% vinyl acetate–99% vinyl chloroacetate.

Copolymerization of the two monomers can be carried out by bulk polymerization, emulsion polymerization, suspension polymerization or solution polymerization, each of these techniques having certain advantages and disadvantages well known in the art, the method selected depending upon the application intended and the equipment and reactants available. Preparation of a homopolymer is advantageously carried out as described in Serial No. 689,768, filed October 14, 1957. Generally, in preparing the copolymer it is preferred at present to use bulk polymerization, although other polymerizaton methods certainly are not to be excluded. In carrying out the copolymerization, the monomers, containing a small amount of initiator, e.g., about 0.01% to about 1.0% by weight of the monomer of an initiator consisting of a peroxide catalyst, such as lauroyl peroxide (Alperox C), acetyl peroxide, benzoyl peroxide, succinic acid peroxide or the like, is maintained at a temperature within the range from about room temperature (this low temperature being feasible if a suitable peroxide initiator is employed, e.g., acetyl peroxide) up to a higher temperature dictated by the temperature at which undesirably low molecular weight polymer is obtained. The polymerization should be carried out in an inert atmosphere, i.e., a non-oxidizing atmosphere such as nitrogen, helium or the like. There results from such polymerizaton a copolymer, e.g., containing up to 10% by weight of vinyl acetate, or a polymer, which in accordance with one embodiment of the present invention is then hydrolyzed, preferably alcoholized, in order to obtain a polyvinyl alcohol of singularly-improved water resistance.

The term "hydrolysis" as employed throughout the specification and claims is intended broadly to refer to the conversion of the polymer in accordance with known process steps into polyvinyl alcohol. The term "hydrolysis" also is intended to include ammonolysis and alcoholysis. At present, alcoholysis constitutes the preferred form of hydrolysis. Hence, while specific reference is made hereinafter to this form of hydrolysis, it will be understood that the invention is not so limited.

In carrying out the alcoholysis it is convenient to dissolve the copolymer in a solvent which is inert in basic solutions. Specific illustrative and preferred solvents are tetrahydrofuran and dioxane, although any ether or acetal which dissolves the polymer also may be used. Generally, in carrying out the alcoholysis, the polymer, dissolved in a solvent, is added to a refluxing anhydrous alkali metal alcoholate solution which may or may not contain a further solvent such as tetrahydrofuran, a specifically illustrative and preferred mixture being about 80 volumes of tetrahydrofuran and 20 volumes of methanol. To this refluxing mixture is added sufficient of an alkali metal alcoholate, i.e., the reaction product of an alkanol, especially a lower alcohol such as methanol, ethanol, propanol, or the like, and an alkali metal. The alkali metal alcoholate is dissolved in a larger quantity of an alkanol, generally and preferably methanol. The expression "alkali metal" is intended to refer to the several alkali metals, i. e., sodium, potassium, lithium, rubidium and cesium, sodium, being preferred.

A specific illustrative alcoholysis mixture comprises about 10% by volume of sodium methylate and 90% by volume of methanol. As to the alkalinity required in the alcoholysis medium, it is desirable to have a 0.3% to 0.5% alkalinity as measured by titration. If a substantially larger percentage of alkalinity exists, the resultant polymer often tends to be discolored. On the other hand, if insufficient alkalinity exists, alcoholysis generally is not effected.

The amount of the sodium methylate or other alkali metal alcoholate added is dictated by the amount necessary to keep the alcoholysis medium basic. The alcoholysis is carried out until the polymer is converted to polyvinyl alcohol.

The resultant polyvinyl alcohol obtained from the copolymer or homopolymer is neutralized, generally with a weak organic acid such as acetic acid which is preferred to a strong acid in that it avoids undesired side reactions. The thus-neutralized polyvinyl alchol is filtered, washed with an organic solvent such as methanol, or, if desired, cold water which demonstrates one of the differences between this product and prior polyvinyl alcohol in that cold water washing of polyvinyl alcohol of this invention does not result in the formation of a sticky, gummy mass as is the case with the conventional polyvinyl alcohol. The resultant polymer is then dried and is ready for use.

In a further embodiment of the invention, the polyvinyl alcohol thus obtained, or the polyvinyl alcohol obtained by the practice of the invention described and claimed in Serial No. 689,768, filed October 14, 1957, is then reacted with an "aldehyde" which term is intended to refer broadly to compounds containing the —CHO group, to obtain a water-insoluble product, generically termed an "acetal," which term, as used in the specification and claims, is intended broadly to refer to the reaction product of a polyvinyl alcohol or polymer of this invention with an aldehyde as just defined.

Illustrative aldehydes are aliphatic, saturated formaldehyde, acetaldehyde, propionaldehyde, butyraldehyde, i-butyraldehyde, valeraldehyde, i-valeraldehyde, caproaldehyde, enanthaldehyde, nonaldehyde, palmitic aldehyde; aliphatic, unsaturated aldehydes such as acrolein, crotonaldehyde, tiglic aldehyde, citral geranial, propiolaldehyde; aliphatic dialdehydes such as glyoxal, succinaldehyde or adipaldehyde; and aromatic aldehydes such as benzaldehyde, tolualdehyde, alpha-tolualdehyde, cinnamaldehyde, salicylaldehyde, anisaldehyde, naphthaldehyde and anthraldehyde. Prepared aldehydes at present are acetaldehyde, formaldehyde, propionaldehyde and butyraldehyde.

Conversion to an acetal desirably is carried out in a slurry typically employing as a slurrying medium a solvent in which the acetal is insoluble, e. g., heptane, hexane, decane, or the like. A catalyst for this conversion step generally should be an "esterification" catalyst soluble in slurrying medium. Illustrative catalysts are oxalic acid, concentrated sulfuric acid, hydrochloric acid, paratoluene sulfonic acid, or the like.

The temperature of the conversion of the polyvinyl alcohol advantageously is the reflux temperature of the reaction mixture, e.g., 20°–200° C., typically 70°–100° C. The proportions of reactants should generally embody a stoichiometric excess of the aldehyde to favor reaction completion; removal of water formed during the reaction also is a preferred practice, it generally being desirable to carry out the reaction until a stoichiometric amount of water is separated.

Alternatively, the practice of this invention also contemplates the preparation of acetals by direct reaction of the homopolymer, or a copolymer of this invention, directly with an aldehyde to form an acetal.

The preparation of the acetal from either the homopolymer or copolymer can be carried out using a solvent such as glacial acetic acid or other carboxylic acid, the choice of solvent being limited by the requirement that it dissolves the polymer and does not cause undesired side reactions. Desired reaction temperatures for the conversion of the polymer or copolymer to an acetal generally are within the range from about 60° to 80° C., preferably about 75° C., it being important to maintain the reactants in solution. The reaction preferably is carried out in the presence of about 1% to 10% by weight, preferably 5%, of substances such as oxalic acid, concentrated sulfuric acid, hydrochloric acid, p-toluene sulfonic acid, or the like as an acidic hydrolysis catalyst.

In order that those skilled in the art may more completely understand the present invention and the preferred methods by which the same may be carried into effect, the following specific examples are offered:

EXAMPLE I

Part A

COPOLYMERIZATION OF VINYL ACETATE AND VINYL CHLOROACETATE

The following monomer mixtures are prepared:

| No. | Vinyl acetate, percent by weight | Vinyl chloroacetate, percent by weight | Water solubility [1] | Copolymer viscosity |
|---|---|---|---|---|
| 1 | 0.0 | 100.0 | Insoluble | |
| 2 | 1.0 | 99.0 | do | 1.31 |
| 3 | 3.0 | 97.0 | Soluble | 1.53 |
| 4 | 10.0 | 90.0 | do | 1.51 |
| 5 | 20.0 | 80.0 | do | 1.42 |

[1] Of derived polyvinyl alcohol.

Each of the above mixtures contains approximately 1/10% of lauroyl peroxide catalyst (Alperox C) based on the weight of monomers. The mixtures are placed in 8 ml. vials, flushed with nitrogen and placed in a 45° C. water bath. After three days, the polymer is removed from the vials and dissolved in tetrahydrofuran to obtain approximately a 30% solution. The polymer is precipitated with petroleum ether and placed in a vacuum oven to dry. 0.1 g. of each of the above copolymers is placed in a 100 ml. volumetric flask which is then filled with tetrahydrofuran (distilled) for viscosity determination, the results being indicated in the foregoing table.

Part B

ALCOHOLYSIS OF POLYVINYL CHLOROACETATE AND POLYVINYL ACETATE COPOLYMER

A solution of 21.1 g. polymer (No. 1 above) in tetrahydrofuran, as a 30% solution, is placed in an addition funnel and added dropwise along with sodium methoxide to 50 ml. of methyl alcohol. The reactants are left to reflux for 5 hours followed by removing the resultant polyvinyl alcohol, filtering and drying in a vacuum oven.

Part C

POLYVINYL BUTYRAL 500 ml. of heptane, 35 g. butyraldehyde, 3 g. oxalic acid and 44 g. polyvinyl alcohol as produced by the process of Example I (Parts A and B) are placed in a 1-liter flask fitted with a water trap. The mixture is heated to reflux and the evolved $H_2O$ is separated. The reaction is carried out until a stoichiometric amount of water separates, i.e., 8.5 to 9 ml. The resulting polyvinyl butyral is filtered, dried and slurried in $H_2O$, filtered and dried in a vacuum oven.

EXAMPLE II 22 g. of polyvinyl alcohol produced by the method of

Serial No. 689,768, Example I, 38 g. (0.5 mol HCHO) of 40% aqueous formaldehyde, 1.5 g. of oxalic acid and 250 ml. acetic acid are placed in a flask equipped with stirrer, reflux condenser and thermometer. The mixture is heated to 50° C. and stirred for about 24 hours followed by cooling and stirring into 600 ml. of ice water. The resultant polyvinyl formal is separated by filtration and the cream colored polymer is washed several times with dilute ammonium hydroxide followed by washing with $H_2O$ until the supernatant liquid is neutral.

The desired polyvinyl formal is then filtered and dried in a vacuum oven at 50° C. resulting in 21.0 g. polyvinyl formal. A film of this formal, insoluble in the usual formal solvents, e.g., acetone and methanol, is pressed at 275° F. and 40,000 p.s.i. giving a considerably less flexible and more brittle film than the corresponding formal made directly from the chloroacetate.

EXAMPLE III 100 g. acetic acid and 70 g. polyvinyl chloroacetate are placed in a flask equipped with stirrer, reflux condenser and thermometer. The mixture is heated to 95° C. until the polymer dissolves. It is then cooled to 75° C. with a water bath and 93 g. of 40% formalin solution containing 3.4 g. concentrated sulfuric acid, is added rapidly. The viscosity of the solution rapidly incerases and a dark colored polymer separates. Reaction is continued at 75°–80° C. until the polymer dissolves. The mixture is then cooled and water is added slowly to precipitate the polyvinyl formal which is separated and washed several times with water. The product is comminuted and rinsed with dilute ammonium hydroxide, washed with water and further comminuted. This washing step is repeated and the product soaked in ammonium hydroxide solution for one-half hour and again washed with water, separated and dried at 60° C. in a vacuum oven. The polymer is pressed at 40,000 p.s.i at 240° F. yielding a flexible sheet which has moderate tensil strength.

EXAMPLE IV 335 g. (2.75 mols) of polyvinyl chloroacetate is placed in a 2000 ml. resin kettle equipped with stirrer, thermometer, and reflux condenser. 475 ml. glacial acetic acid is added and the mixture is heated to 90°–95° C. by a water bath over night. The light brown solution is cooled to 75° C. and 207 g. 40% formalin (2.75 mols HCHO) containing 16.1 g. concentrated sulfuric acid is added over a 15 minute period. The stirring of the partially coagulated mass is continued for 27 hours, at which time the polymer has dissolved to form a viscous solution. This solution is cooled to 10° C. and the addition of $H_2O$ is begun while stirring vigorously. After about 400 ml. of water is added, the polymer precipitates in the form of small particles which agglomerate into a large solid mass which is removed and stirred in water. The polymer is stirred for about 1 hour and is washed with water. After four washes, dilute ammonium hydroxide is substituted for the water, followed by further stirring and filtering. The mixture is then washed with water until neutral and the polymer is separated by filtration. After pressing dry on the filter, the creamy white polyvinyl formal is dried in a vacuum oven at 60° C.

EXAMPLE V 337 g. (2.8 mols) of polyvinyl chloroacetate is dissolved in 475 ml. glacial acetic acid as in the previous example and the temperature of the solution is adjusted to 75°–80° C. To this solution is added 207 g. (2.75 mols) of 40% formalin containing 16.1 g. of concentrated sulfuric acid over a 15 minute period and the resultant partially precipitated mass is stirred thoroughly. The reaction is stopped after about 27 hours and the resultant clear brown solution is cooled to 10° C. The mixture is stirred vigorously and water is added slowly. The polymer precipitates after about 500 ml. of water has been introduced. This desired polyvinyl formal is placed in a stainless steel beaker and washed in water for about 2½ hours. The water is then replaced with a dilute ammonium hydroxide solution and the mixture is stirred for 3 hours followed by mixing with 2000 ml. portions of water. The water is separated by filtration and the desired polyvinyl formal washed with water and dried at 50° C. in a vacuum oven.

EXAMPLE VI 30 ml. of tetrahydrofuran and 150 ml. methanol are placed in a 500 ml. resin kettle equipped with stirrer, thermometer, reflux condenser and 2 addition funnels. The mixture is heated to reflux and about 30 drops of 10% sodium methoxide in methanol solution is added. A vinyl chloroacetate-vinyl acetate copolymer solution is then slowly added followed by refluxing the reaction mixture for about 2 hours. The slurry of polyvinyl alcohol is then neutralized with acetic acid, cooled, filtered and washed with methanol followed by drying at 60° C. in a vacuum oven.

EXAMPLE VII

Part A

COPOLYMERIZATION OF VINYL ACETATE AND VINYL TRIFLUOROACETATE

The following monomer mixtures are prepared:

| No. | Vinyl acetate (percent by weight) | Vinyl trifluoroacetate (percent by weight) |
|---|---|---|
| 1 | 0.5 | 99.5 |
| 2 | 1.0 | 99.0 |
| 3 | 3.0 | 97.0 |

Each is placed in a glass tube together with 0.2% benzoyl peroxide. The tubes are cooled in a Dry Ice-acetone bath and the pressure reduced to about 1 mm. Hg with a vacuum pump. They are then sealed off with a flame and placed in a water bath at 60° C. After 24 hours, the polymer is removed, dissolved in tetrahydrofuran and reprecipitated into petroleum ether. The precipitated polymer is dried in a vacuum oven.

Part B

ALCOHOLYSIS OF THE ABOVE COPOLYMERS

This was carried out in the manner described in Part B of Example I. All the polyvinyl alcohols produced were substantially insoluble in water. Reaction of these polyvinyl alcohols with aldehydes, formaldehyde, acetaldehyde and butyraldehyde produces corresponding polyvinyl acetals.

The polyvinyl alcohol of this invention which is insoluble in water is soluble in varying degree in liquids such as concentrated aqueous solutions of inorganic salts, e.g., sodium thiocyanate, zinc chloride, calcium thiocyanate, lithium bromide, aluminum perchlorate, or the like.

Products of this invention are useful in paper coatings, ceramics, paints, leather finishes, safety glass interlayers, films, cosmetics, pharmaceuticals, plastics, and the like.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of preparing a polymer which comprises the steps of polymerizing a polymerizable material selected from the group consisting of vinyl chloracetate monomer and vinyl trifluoracetate monomer and mixtures of such monomers with no more than about 10% by weight of vinyl acetate, hydrolyzing the resultant polymer in the presence of a solvent for the polymer inert in basic solutions, the solvent being selected from the group consisting of tetrahydrofuran and dioxane, carrying out the hydrolysis in a refluxing anhydrous alkali metal alcoholate solution, neutralizing the resultant polyvinyl alcohol and reacting it with an aldehyde in a slurry using a solvent in which the desired acetal is insoluble, in the presence of an esterification catalyst soluble in the slurrying, at the reflux temperature of the reaction mixture, using a stoichiometric excess of the aldehyde and about 1%–10% by weight of a catalyst selected from the group consisting of oxalic acid, concentrated sulfuric acid, hydrochloric acid, p-toluene sulfonic acid.

2. The method of preparing a water-insoluble polyvinyl alcohol which comprises the steps of (1) combining a peroxide polymerization initiator and a polymerizable material selected from the group consisting of (a) a monomer having the structure $$R(CR^1R^2)_nCOOCR^3=CR^4_2$$

wherein R is selected from the group consisting of Cl and F; $R^1$ and $R^2$ are selected from the group consisting of H, Cl and F; $R^3$ is selected from the group consisting of H and lower alkyl radicals having 1 to 3 carbon atoms; $R^4$ is selected from the group consisting of H and F; and n is a number from 0 to 20, inclusive; and (b) mixtures of such monomers with no more than about 10% by weight of vinyl acetate; (2) polymerizing the monomer at a temperature of about 45°–60° C.; (3) hydrolyzing the resultant polymer in the presence of a solvent for the polymer which is inert in basic solutions, the solvent being selected from the group consisting of tetrahydrofuran and dioxane, carrying out the hydrolysis in a refluxing anhydrous alkali metal alcoholate, and (4) neutralizing the resultant polyvinyl alcohol.

3. The method of claim 2 wherein the polymerizable material is vinyl chloracetate.

4. The method of claim 2 wherein the polymerizable material is vinyl trifluoracetate.

5. The method of claim 2 wherein the polymerizable material is a mixture of vinyl chloracetate and no more than about 10% by weight of vinyl acetate.

6. The method of claim 5 wherein the vinyl acetate comprises no more than about 1% by weight of the polymerizable material.

7. The method of claim 2 wherein the polymerizable material is a mixture of vinyl trifluoracetate and no more than about 10% by weight of vinyl acetate.

References Cited in the file of this patent

UNITED STATES PATENTS

| | | |
|---|---|---|
| 1,746,665 | Matheson et al. | Feb. 11, 1930 |
| 2,108,857 | Hopff et al. | Feb. 22, 1938 |
| 2,109,883 | Herrmann et al. | Mar. 1, 1938 |
| 2,325,513 | Herrmann et al. | July 27, 1943 |
| 2,561,458 | Bisch | July 24, 1951 |
| 2,610,360 | Cline et al. | Sept. 16, 1952 |
| 2,862,908 | Jones et al. | Dec. 2, 1958 |
| 2,915,504 | Berardinelli | Dec. 1, 1959 |

FOREIGN PATENTS

| | | |
|---|---|---|
| 827,867 | France | Feb. 2, 1938 |
| 514,593 | Germany | Dec. 18, 1930 |

OTHER REFERENCES

Schildknecht: Vinyl and Related Polymers, John Wiley and Sons, publishers, copyright 1952, pp. 358–360.